May 12, 1953     W. S. RAMSAY     2,637,890
METHOD OF MAKING METALLIC AND CLAY ARTICLES
Filed Sept. 11, 1950
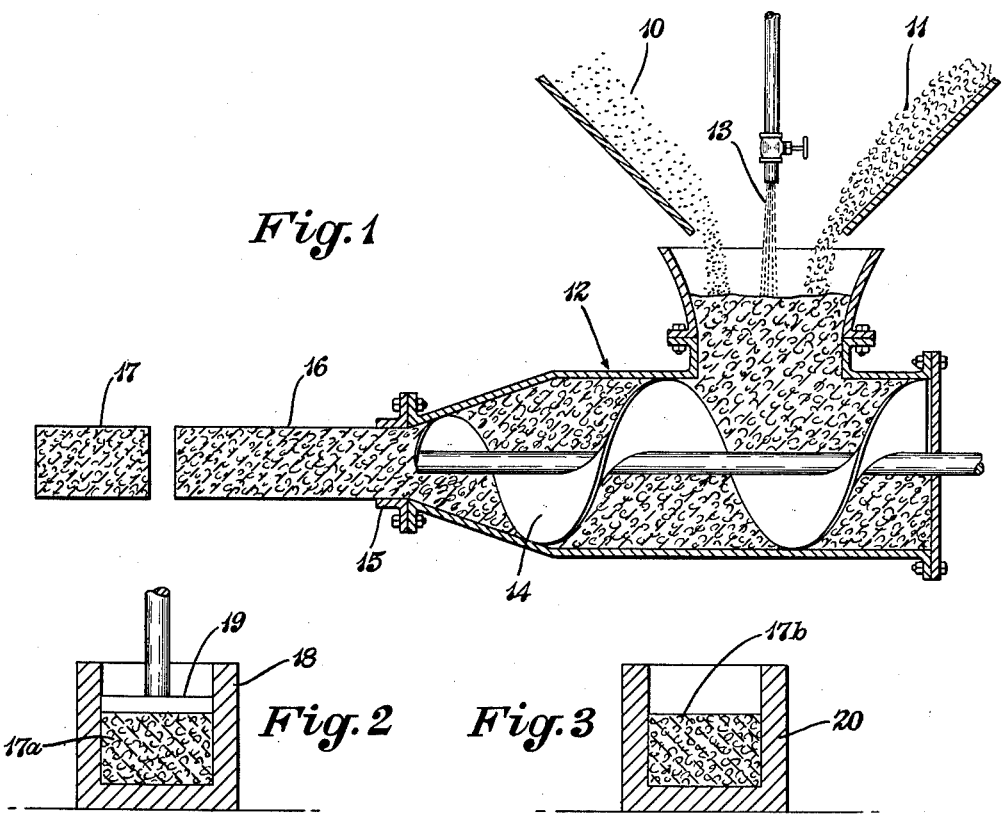
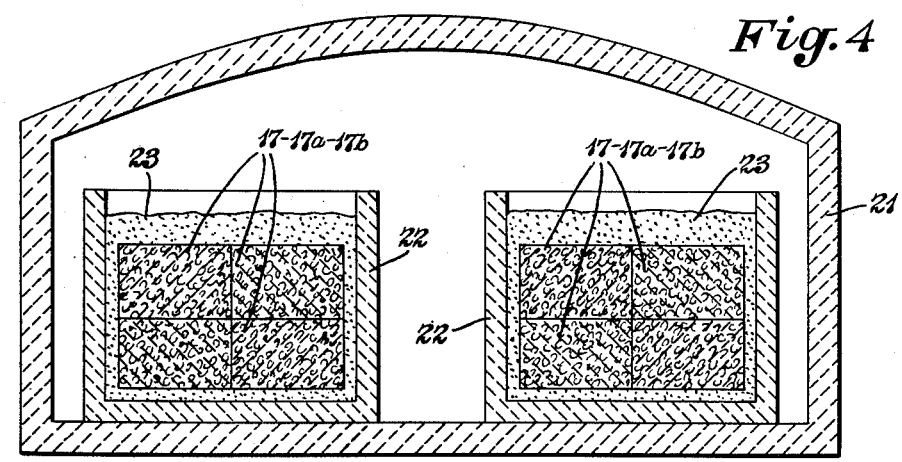
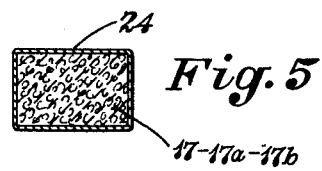
Inventor
William S. Ramsay
Attorneys Patented May 12, 1953

2,637,890

UNITED STATES PATENT OFFICE 2,637,890

METHOD OF MAKING METALLIC AND CLAY ARTICLES

William S. Ramsay, Canton, Ohio, assignor to Stark Ceramics, Inc., Canton, Ohio, a corporation of Ohio Application September 11, 1950, Serial No. 184,131

6 Claims. (Cl. 25—156)

The invention relates to the method of making formed shapes for use under conditions where they are subjected to thermal shock and corrosive action.

It is well known that articles formed of burned clay, while highly resistant to corrosive action have relatively slight resistance to thermal shock, and that metallic articles, such as iron or steel, although highly resistant to thermal shock readily succumb to corrosive action.

The object of the present invention is to provide a method of producing blocks, tiles or other formed shapes which will have a maximum resistance to both thermal shock and corrosive action.

Another object is to provide a method of forming such shapes from a mixture of clay and metallic particles such as iron or steel borings or turnings.

A further object is to provide a method of forming such shapes by extruding, pressing or casting a mixture of clay and metal particles, with sufficient water to make a plastic mass, then drying and burning the articles in an inert atmosphere which protects the metal particles from oxidation until the clay has matured, thus producing a finished article in which the metal particles reinforce and strengthen the same so as to resist thermal shocks and the burned clay protects the metallic particles against corrosive action.

The above and other objects which will be apparent from the drawing and following description, or which may be later referred to, may be attained by carrying out the improved method in the manner hereinafter described in details, reference being had to the accompanying drawing, in which:

Figure 1 is a sectional view of an auger machine, showing the manner in which the clay and iron or steel borings or turnings may be mixed and extruded to produce the desired shapes;

Fig. 2 a sectional view, showing the manner in which the mixture of clay and metallic borings or turnings may be pressed to the desired shape;

Fig. 3 a similar view, showing the manner in which the mixture of clay and metallic particles may be cast;

Fig. 4 a sectional view through a kiln, showing one method of burning the formed articles in an inert atmosphere; and Fig. 5 a section through a finished block or shape having a coating of glaze or vitreous engobe thereon.

Referring first to Fig. 1 of the drawing, desired amounts of ground clay as indicated at 10 and ferrous metal particles, such as iron or steel borings or turnings, as indicated at 11, may be charged into a suitable mixing apparatus such as the auger machine indicated generally at 12 together with a sufficient amount of water, as indicated at 13, to produce a plastic mass which is thoroughly intermixed, in usual and well known manner, as by the auger 14 and extruded through the die 15 in a column 16 which may be cut into suitable shapes, such as the block indicated at 17.

In carrying out the invention the proportion of clay and borings or turnings may vary from 50% of each, by weight, to 85% borings or turnings and 15% clay. It is preferable that ball clay be used for this process although for some purposes fire clay may be desirable.

The amount of water required will vary according to the proportions of clay and metallic particles used in the mixture, but for best results not over 10% of water by weight should be used, this percentage of water decreasing in proportion to the amount of clay used in the mixture.

If it is desired to form the articles by pressing, the same proportions of clay, turnings or borings, and water as above given, may be mixed in any suitable apparatus, the mixture then being placed in a mold as indicated at 18 in Fig. 2 and pressed to the desired shape as by a ram 19, forming the article indicated at 17a in Fig. 2.

If it is desired to form the article by casting, the same proportions of clay and ferrous metal particles as above given, may be mixed with a suitable amount of water to permit the mixture to be poured.

As in the above cases, the amount of water required will vary with the amount of clay used in the mixture but a greater percentage of water is required than for extruding or pressing. Usually 10% to 20% of water by weight is sufficient to produce the desired consistency.

This mixture is poured into a mold, as indicated at 20 in Fig. 3, and after the cast article, indicated at 17b in said figure, has set, it may be removed from the mold. It is preferable that a small amount of a deflocculent, such as sodium silicate, be included in the mixture in order to facilitate the setting of the article. About $\frac{1}{10}$ of 1% of sodium silicate is the desired amount of deflocculent for this purpose.

Each of the articles 17, 17a or 17b, formed in the manner above described, may then be dried by conventional clay working methods preparatory to burning. After the formed articles or shapes 17, 17a or 17b have been satisfactorily dried for burning, they are placed in a kiln or the like, in an inert or reducing atmosphere, and burned at a temperature of about 2100° F., the burning period being the same as required for the burning of bricks or other clay articles.

By burning the formed shapes in an inert or reducing atmosphere, the iron or clay particles will be protected against oxidation until the clay has matured, and the finished, burned articles will be highly resistant to thermal shock, due to the metal particles therein, and will also be highly resistant to corrosion, since the metal particles are embedded in and protected by the burned clay.

As shown in Fig. 4, one method of excluding oxidation from the formed shapes during the burning operation may be attained by completely surrounding the articles with powdered coal, or other granular carbonaceous material.

In this figure, an ordinary brick kiln, of any usual and well known design, is diagrammatically indicated at 21. The formed shapes 17, 17a or 17b may be placed in a container, as indicated at 22, and completely surrounded with powdered coal, or other granular carbonaceous material, as indicated at 23.

Thus, while the kiln atmosphere may be oxidizing, the formed shapes are protected from oxidation by the surrounding powdered coal so that they will be burned in an inert atmosphere.

Although the iron or steel particles in such a formed shape are protected from corrosion by the clay, further protection may be attained if desired by coating each article with a glaze or vitreous engobe, as indicated at 24 in Fig. 5.

The glaze coating is applied by dipping, or otherwise applying a coating of the glaze to the burned shape and again firing the glaze coated burned shape to mature the glaze coating thereon. If it is desired to apply a vitreous engobe coating, the formed and dried shape is dipped or otherwise coated with vitreous engobe, and the dried formed, engobe shape is then fired.

The iron or steel particles make the block resistant to thermal shock and increase the heat conductivity of the clay. Such blocks or shapes may be used in any place where they will be subjected to thermal shock and corrosive action, to better advantage than with clay or metallic shapes.

I claim:

1. The method of making clay and metal shapes which consists in mixing only clay with irregular curled ferrous metal particles and water, forming the mixture to desired shape under pressure, drying the formed shape, placing it in a container and completely surrounding the formed shape in the container with granular carbonaceous material and burning it, producing a ceramic article with irregular curled ferrous metal particles entirely embedded therein, which is highly resistant to thermal shock and to corrosion and oxidization.

2. The method of making clay and metal shapes which consists in mixing only clay with irregular curled ferrous metal particles and water, extruding the mixture to desired shape, drying the formed shape placing it in a container and completely surrounding the formed shape in the container with granular carbonaceous material and then burning it in an inert atmosphere, producing a ceramic article with irregular curled ferrous metal particles entirely embedded therein, which is highly resistant to thermal shock and to corrosion and oxidization.

3. The method of making clay and metal shapes which consists in mixing only clay with irregular curled ferrous metal particles and water, pressing the mixture to desired shape, drying the formed shape placing it in a container and completely surrounding the formed shape in the container with granular carbonaceous material and then burning it in an inert atmosphere, producing a ceramic article with irregular curled ferrous metal particles entirely embedded therein, which is highly resistant to thermal shock and to corrosion and oxidization.

4. The method of making clay and metal shapes which consists in mixing 50% to 15% only clay with 50% to 85% iron and steel turnings and borings and up to 20% water, forming the mixture desired shapes under pressure, drying the formed shape placing it in a container and completely surrounding the formed shape in the container with granular carbonaceous material and then burning it in an inert atmosphere at about 2100° F. for a sufficient period to cure the clay, producing a ceramic article with irregular curled ferrous metal particles entirely embedded therein, which is highly resistant to thermal shock and to corrosion and oxidization.

5. The method of making clay and metal shapes which consists in mixing 15% only clay with 85% iron and steel turnings and borings and about 10% water, forming the mixture to desired shapes under pressure, drying the formed shape placing it in a container and completely surrounding the formed shape in the container with granular carbonaceous material and then burning it in an inert atmosphere at about 2100° F. for a sufficient period to cure the clay, producing a ceramic article with irregular curled ferrous metal particles entirely embedded therein, which is highly resistant to thermal shock and to corrosion and oxidization.

6. The method of making clay and metal shapes which consists in mixing only clay with irregular curled ferrous metal particles and water, forming the mixture to desired shape under pressure, drying the formed shape, applying a vitreous engobe coating upon the formed, dried shape placing it in a container and completely surrounding the formed shape in the container with granular carbonaceous material, and then burning it in an inert atmosphere, producing a ceramic article with irregular curled ferrous metal particles entirely embedded therein, which is highly resistant to thermal shock and to corrosion and oxidization.

WILLIAM S. RAMSAY.

References Cited in the file of this patent

UNITED STATES PATENTS

| Number | Name | Date |
|---|---|---|
| 220,715 | Hinklein | Oct. 21, 1879 |
| 906,173 | Tone | Dec. 8, 1908 |
| 950,954 | Powers | Mar. 1, 1910 |
| 1,588,473 | Kelleher | June 15, 1926 |
| 1,802,776 | Pence | Apr. 28, 1931 |
| 1,826,454 | Comstock | Oct. 6, 1931 |
| 2,116,400 | Marth | May 3, 1938 |
| 2,364,108 | Swentzell | Dec. 5, 1944 |
| 2,472,206 | Greene | June 7, 1949 |